US007009938B2

(12) United States Patent
Banerjee et al.

(10) Patent No.: US 7,009,938 B2
(45) Date of Patent: Mar. 7, 2006

(54) REDUCTION OF SERVER OVERLOAD (75) Inventors: Dwip N. Banerjee, Austin, TX (US); Vinit Jain, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 964 days.

(21) Appl. No.: 09/892,963

(22) Filed: Jun. 27, 2001

(65) Prior Publication Data
US 2003/0002441 A1 Jan. 2, 2003

(51) Int. Cl.
*H04J 1/16* (2006.01)
*H04J 3/14* (2006.01)

(52) U.S. Cl. ............... 370/230; 370/349; 370/392; 709/225

(58) Field of Classification Search ........... 370/229, 370/230, 235, 349, 392, 395.21, 242, 468, 370/439, 462; 709/203, 223, 224–225, 226
See application file for complete search history.

(56) References Cited

U.S. PATENT DOCUMENTS

| 5,535,375 | A | | 7/1996 | Eshel et al. ............ 391/500 |
| 5,675,721 | A | | 10/1997 | Freedman et al. ....... 395/129 |
| 5,878,224 | A | * | 3/1999 | Smith ..................... 709/224 |
| 5,892,903 | A | | 4/1999 | Klaus ................... 395/187.01 |
| 6,098,099 | A | | 8/2000 | Ellesson et al. ........ 709/223 |
| 6,101,541 | A | * | 8/2000 | Ellesson et al. ........ 709/225 |
| 6,182,086 | B1 | | 1/2001 | Lomet et al. ........... 707/202 |
| 6,230,200 | B1 | * | 5/2001 | Forecast et al. ........ 709/226 |
| 6,279,113 | B1 | | 8/2001 | Vaidya .................... 713/201 |
| 6,389,532 | B1 | | 5/2002 | Gupta et al. ............... 713/60 |
| 6,484,161 | B1 | * | 11/2002 | Chipalkatti et al. ......... 707/3 |
| 6,694,358 | B1 | * | 2/2004 | Swildens et al. ........ 709/218 |
| 6,707,792 | B1 | * | 3/2004 | Volftsun et al. ......... 370/235 |
| 6,816,903 | B1 | * | 11/2004 | Rakoshitz et al. ....... 709/226 |
| 6,834,297 | B1 | * | 12/2004 | Peiffer et al. ............ 709/219 |
| 6,836,785 | B1 | * | 12/2004 | Bakshi et al. ............ 709/203 |
| 2002/0101819 | A1 | * | 8/2002 | Goldstone ................ 370/229 |
| 2002/0101821 | A1 | * | 8/2002 | Feldmann et al. ....... 370/232 |
| 2002/0103631 | A1 | * | 8/2002 | Feldmann et al. ......... 703/22 |
| 2002/0133586 | A1 | * | 9/2002 | Shanklin et al. ......... 709/224 |
| 2002/0138599 | A1 | * | 9/2002 | Dilman et al. ........... 709/223 |
| 2002/0154635 | A1 | * | 10/2002 | Liu ......................... 370/392 |

OTHER PUBLICATIONS

Lammle, T., 2000 SYBEX Inc., Second Edition, pp. 327, 328, 412-416.*

* cited by examiner

*Primary Examiner*—Ajit Patel
*Assistant Examiner*—Chirag Shah
(74) *Attorney, Agent, or Firm*—Robert A. Voight, Jr.; Winstead Sechrest & Minick P.C.; Diana L. Roberts-Gerhardt (57) ABSTRACT

A system and method for preventing at least in part a server overload. A server may send a request to one or more routers located on the server side of a network system to block, i.e., filter, packets of data that may exceed the capacity of the server to service. The one or more routers located on the server side may block, i.e., filter, those packets of data as well as propagate the request to block those packets of data to one or more neighboring routers which may be located on the client side of the network system. The one or more neighboring routers may then block those packets of data that may exceed the capacity of the server to service and/or propagate the request to block those packets of data to their one or more neighboring routers.

41 Claims, 9 Drawing Sheets

Fig. 5
(con't)

REDUCTION OF SERVER OVERLOAD

CROSS REFERENCE TO RELATED APPLICATIONS

The present invention is related to the following U.S. patent application which is incorporated herein by reference:

Ser. No. 09/870,610 entitled "System and Method for Extending Server Security Through Monitored Load Management" filed May 31, 2001.

TECHNICAL FIELD

The present invention relates to the field of network systems, and more particularly to blocking packets of data sent by a client to a server that results in a server overload where the packets may be blocked at routers located on the server and client side of the network system including intermediary routers.

BACKGROUND INFORMATION

A network system may comprise a host machine, e.g., server computer on the Internet commonly referred to as web server, connected via the Internet to one or more computers commonly referred to as clients. The Internet may refer to a network of computers. One or more clients may be connected to the Internet through one or more routers which enable the one or more clients to communicate with the web server. The web server may be connected to the Internet through one or more routers which enable the server to communicate with the one or more clients.

Clients may communicate with the web server by sending a number of packets in a given time interval through one or more routers for the server to process. If the number of packets that need to be serviced in a given time exceeds the capability of the web server, the server may become overloaded thereby causing the server to process the packets at a slower rate or even crash. A client that purposely sends an excessive number of packets to overload the web server may commonly be referred to as a "malicious client."

A server overload including a server crash is at the very least annoying, and may result in serious or irreparable damage. By overloading the server, clients coupled to the server may have to wait a longer period of time to have their requests serviced. Furthermore, if the server crashes, i.e., becomes inoperative, clients coupled to the server may no longer have the ability to communicate with the server.

It would therefore be desirable to at least in part prevent server overloads by blocking an excessive number of packets to be processed by the server that would ordinarily overload the server. It would further be desirable to block the excessive number of packets of data at the routers located on the server and client side of the network system.

SUMMARY

The problems outlined above may at least in part be solved in some embodiments by a server sending a request to one or more routers located on the server side of a network system to block, i.e., filter, packets of data that may exceed the capacity of the server to service. The one or more routers located on the server side may block those packets of data and propagate the request to block those packets of data to one or more neighboring routers which may be located on the client side of the network system. The one or more neighboring routers on the client side of the network system may then block those packets of data that may exceed the capacity of the server to service and/or propagate the request to block those packets of data to their one or more neighboring routers which may be located near the client sending the excessive number of packets of data.

In one embodiment of the present invention, a method for preventing at least in part a server overload may comprise the step of a server detecting an excessive number of packets exceeding a predetermined limit that may cause an overload of the server. The server may then send a request to block the excessive number of packets to one or more of the one or more routers coupled to the server that have a privilege relationship with the server. A privilege relationship may refer to a logical secure connection between the router and the server as indicated in the configuration file in the router and/or in the server. One or more of the routers coupled to the server with a privilege relationship with the server may block the excessive number of packets for a first period of time as well as propagate the request to their one or more neighboring routers which may be located on the client side of the network system. One or more of the one or more neighboring routers may block the excessive number of packets for a second period of time if their configuration file indicates to honor the request to block the excessive number of packets. It is noted that the second period of time during which one or more of the one or more neighboring routers may block the excessive number of packets is less than the first period of time during which one or more of the one or more routers coupled to the server that have a privilege relationship with the server may block the excessive number of packets. Furthermore, one or more of the one or more neighboring routers may propagate the request to their one or more neighboring routers if their configuration file indicates to propagate the request.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
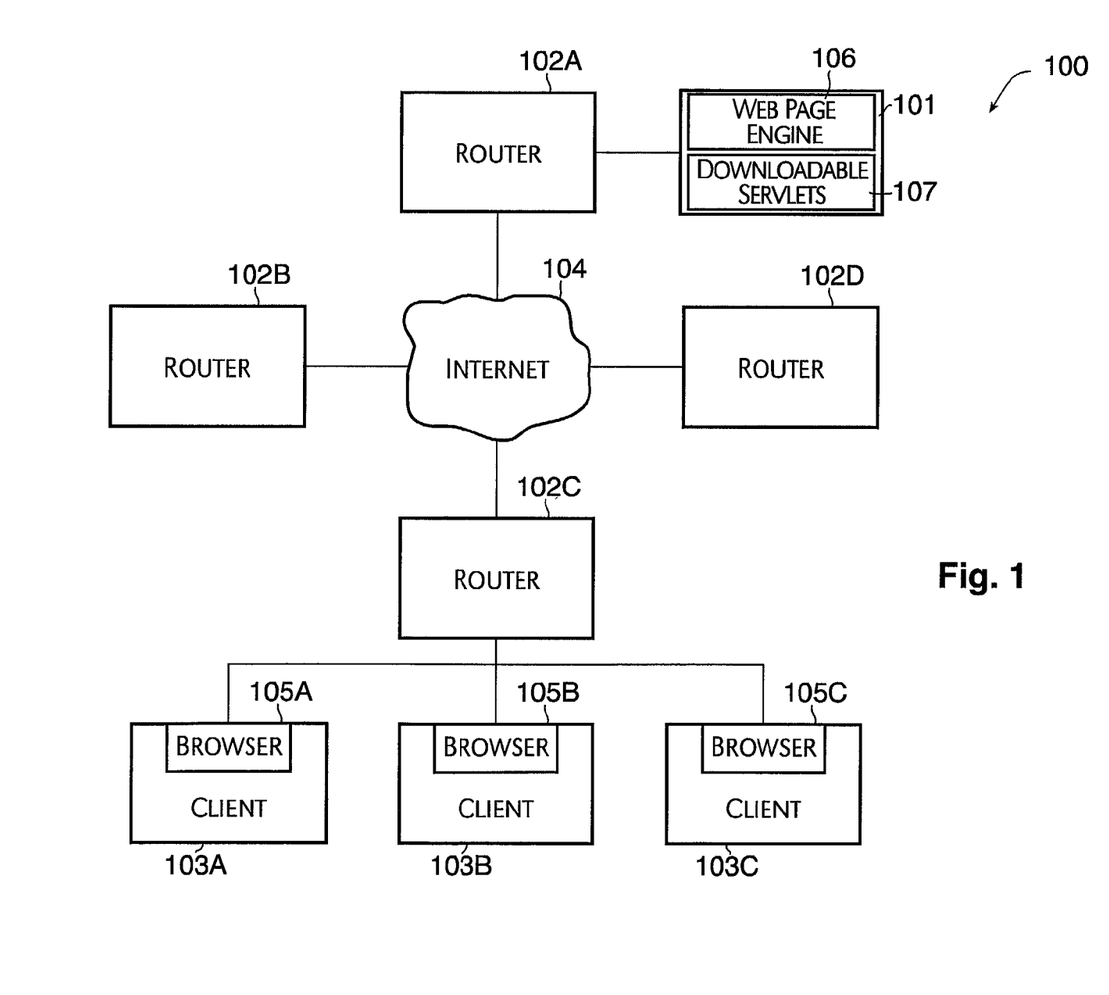
FIG. 1 illustrates an embodiment of a network system configured in accordance with the present invention.

FIG. 1—Network System

FIG. 1 illustrates one embodiment of the present invention of a network system 100. Network system 100 may comprise one or more clients 103A–C connected to a web server 101 via the Internet 104. The Internet 104 may refer to a network of computers. Network system 100 may further comprise a plurality of routers 102A–D configured to forward packets of data where one or more of the plurality of routers, e.g., 102A, are coupled to server 101. The one or more routers, e.g., 102A, that are coupled to server 101 are commonly referred to as "server-side" routers. One or more of the plurality of routers, e.g., 102B–D, may be coupled to one or more clients 103A–C which are configured to forward packets of information from the one or more clients 103A–C to server 101. The one or more routers, e.g., 102B–D, that are coupled to one or more clients 103A–C are commonly referred to as "client-side" routers. Clients 103A–C may collectively or individually be referred to as clients 103 or client 103, respectively. Routers 102A–D may collectively or individually be referred to as routers 102 or router 102, respectively. It is noted that network system 100 may comprise any number of clients 103 as well as any number of routers 102 and that FIG. 1 is illustrative. It is further noted that server 101 may be coupled to any number of routers 102. It is further noted that the connection between clients 101 and the Internet 104 may be any medium type, e.g., wireless, wired. It is further noted that client 103 may be any type of device, e.g., wireless, Personal Digital Assistant (PDA), cell phone, personal computer system, workstation, Internet appliance, configured with the capability of connecting to the Internet 104 and consequently communicating with web server 101. It is further noted that network system 100 may be any type of system that has at least one server, at least one router and at least one client and that FIG. 1 is not to be limited in scope to any one particular embodiment.

Referring to FIG. 1, each client 103A–C may comprise a web browser 105A–C, respectively, which may be configured for communicating with the Internet 104 and for reading and executing web pages. Browsers 105A–C may collectively or individually be referred to as browsers 105 or browser 105, respectively. While the illustrated client engine is a web browser 105, those skilled in the art will recognize that other client engines may be used in accordance with the present invention.

Web server 101 may comprise a web page engine 106 for maintaining and providing access to an Internet web page which is enabled to forward static web pages as well as web pages dynamically created by servlets 107 to web browser 105 of client 103. A servlet may be a program typically written in the Java object-oriented programming language. Servlets 107 typically are server-side applications (often implemented using the Java™ programming language) that may be used to create web pages that contain dynamic or run-time information. Server 101 then delivers the page to client 103, for example via the Internet 104.

As stated in the Background Information section, clients may communicate with the web server by sending a number of packets in a given time interval through one or more routers for the server to process. If the number of packets that need to be serviced in a given time exceeds the capability of the web server, the server may crash due to an excessive load. A server crash is at the very least annoying, and may result in serious or irreparable damage. While the server is inoperative, clients coupled to the server may no longer have the ability to communicate with the server. It would therefore be desirable to at least in part prevent server overloads by blocking an excessive number of packets to be processed by the server that would ordinarily overload the server. It would further be desirable to block the excessive number of packets of data at the routers located on the server and client side of the network system. In one embodiment, an excessive number of packets of data may be blocked, i.e., filtered, by routers 102 on the server side as well as on the client side as discussed in FIG. 5. Configurations of server 101, router 102 and client 103 are discussed below in FIGS. 2, 3 and 4, respectively.

Figure 2:
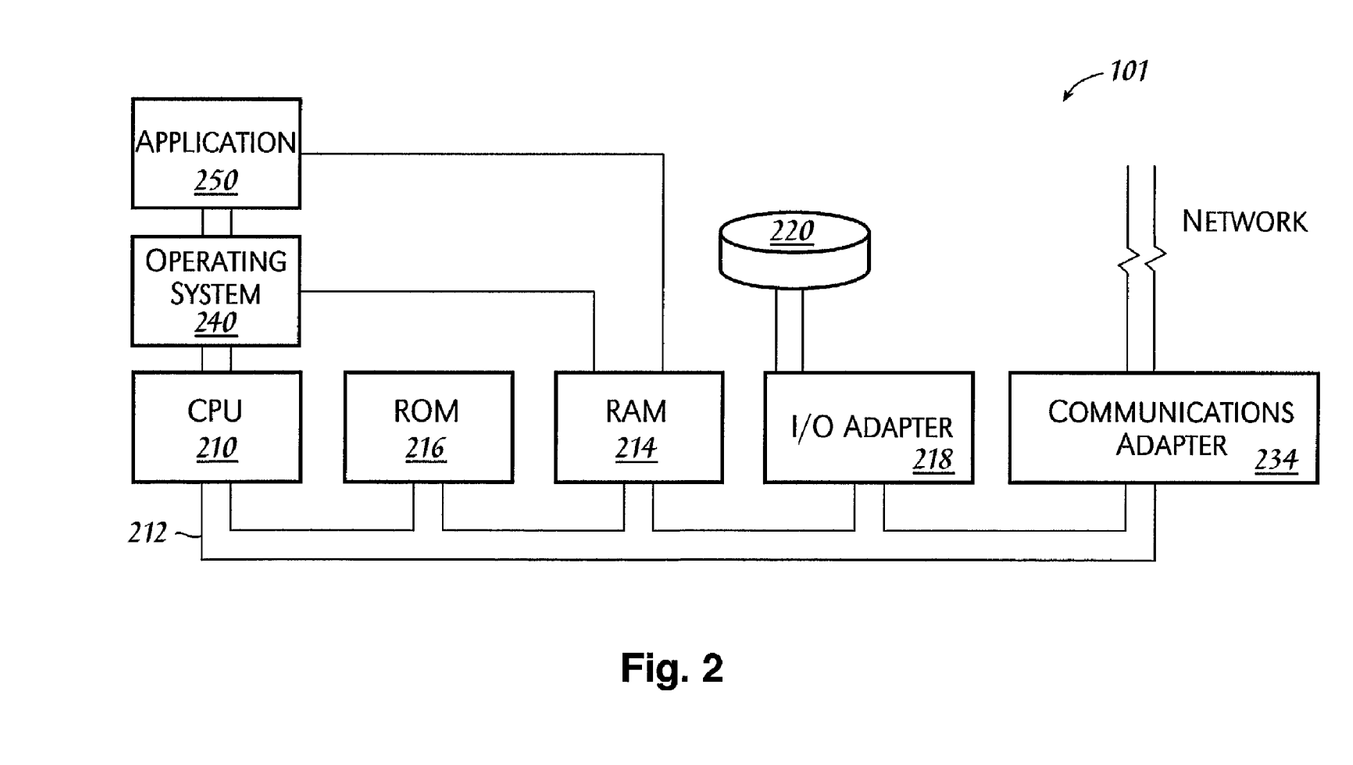
FIG. 2 illustrates an embodiment of a server configured in accordance with the present invention.

FIG. 2—Hardware Configuration of Server

FIG. 2 illustrates an embodiment of the present invention of server 101. Referring to FIG. 2, server 101 may comprise a central processing unit (CPU) 210 coupled to various other components by system bus 212. An operating system 240 runs on CPU 210 and provides control and coordinates the function of the various components of FIG. 2. Application 250, e.g., program for at least in part preventing an overload of server 101, as described in steps 501–503 of FIG. 5, runs in conjunction with operating system 240 which implements the various functions to be performed by application 250. Read only memory (ROM) 216 is coupled to system bus 212 and includes a basic input/output system ("BIOS") that controls certain basic functions of server 101. Random access memory (RAM) 214, disk adapter 218 and communications adapter 234 are also coupled to system bus 212. It should be noted that software components including operating system 240 and application 250 are loaded into RAM 214 which is the computer system's main memory. Disk adapter 218 may be a small computer system interface ("SCSI") adapter that communicates with disk units 220, e.g., disk drive. It is noted that the program of the present invention that may at least in part prevent an overload of server 101, as described in steps 501–503 of FIG. 5, may reside in disk unit 220 or in application 250. It is further noted that disk units 220, e.g., disk drive, may comprise a configuration file as will be discussed in greater detail in the discussion of FIG. 5. It is further noted that the configuration file may be stored in any non-volatile memory. Communications adapter 234 interconnects bus 212 with router 102 enabling server 101 to communicate with router 102 and client 103.

Implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. Until required by server 101, the set of instructions may be stored as a computer program product in another computer memory, for example, in disk drive 220 (which may include a removable memory such as an optical disk or floppy disk for eventual use in disk drive 220). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
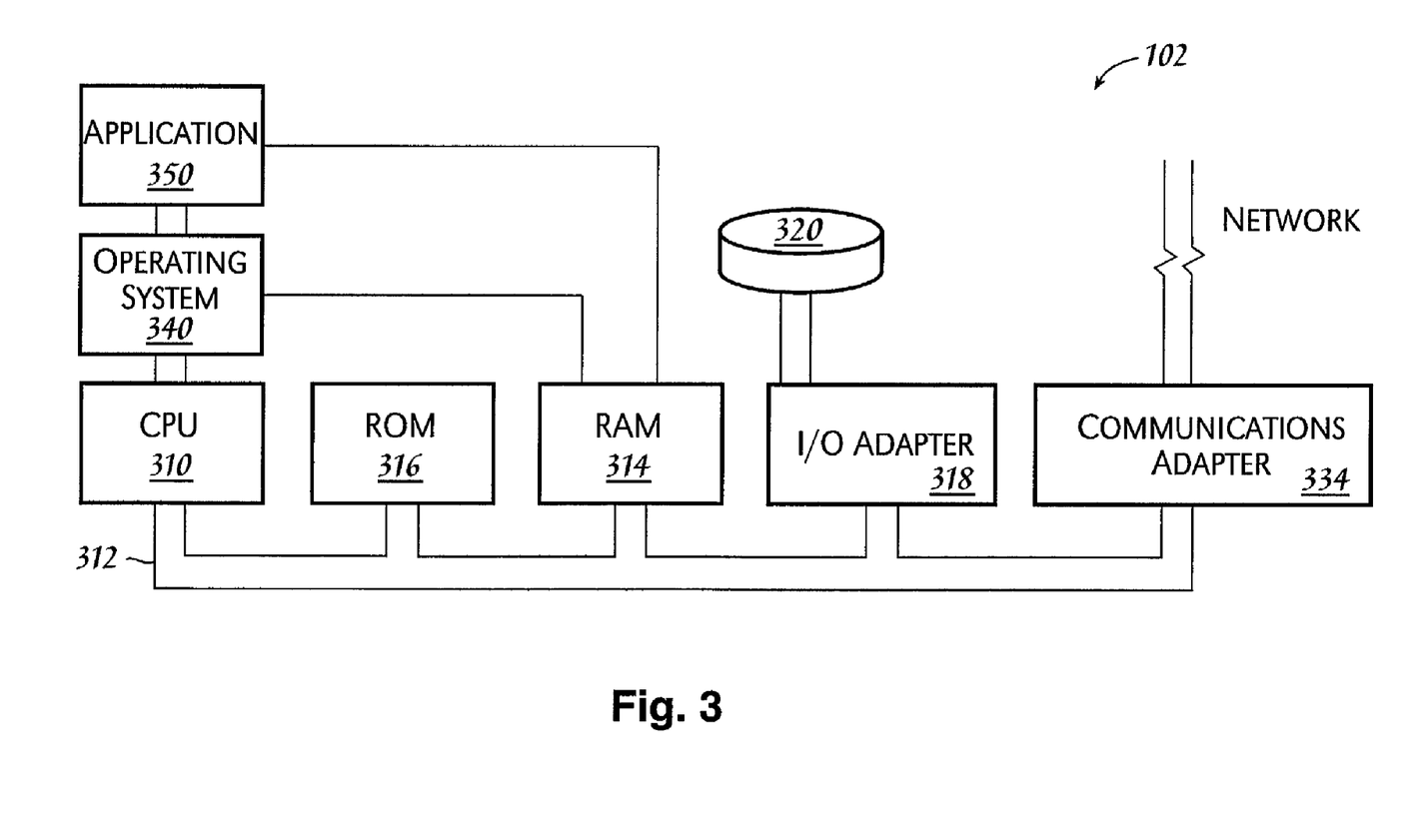
FIG. 3 illustrates an embodiment of a router configured in accordance with the present invention.

FIG. 3—Hardware Configuration of Router

Figure 7:
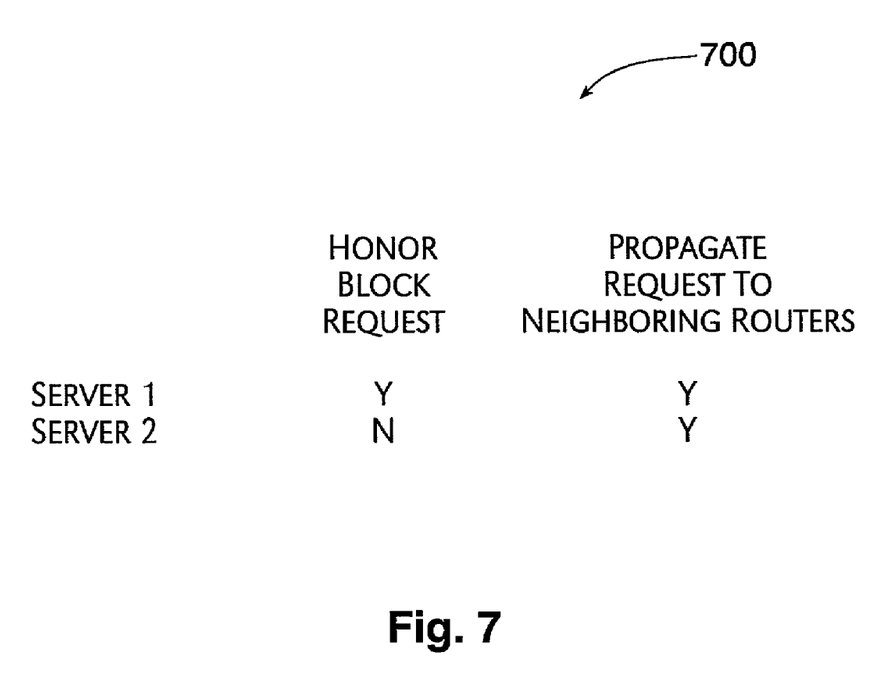
FIG. 7 is an embodiment of the present invention of a configuration file in a router connected to a server.

FIG. 3 illustrates an embodiment of the present invention of router 102. Referring to FIG. 3, router 102 may comprise a central processing unit (CPU) 310 coupled to various other components by system bus 312. An operating system 340 runs on CPU 310 and provides control and coordinates the function of the various components of FIG. 3. Application 350, e.g., program for blocking an excessive number of packets as well as propagating the block request to its neighboring routers 102, as described in steps 504–511 in FIG. 5, runs in conjunction with operating system 340 which implements the various functions to be performed by application 350. Read only memory (ROM) 316 is coupled to system bus 312 and includes a basic input/output system ("BIOS") that controls certain basic functions of router 102. Random access memory (RAM) 314, disk adapter 318 and communications adapter 334 are also coupled to system bus 312. It should be noted that software components including operating system 340 and application 350 are loaded into RAM 314 which is the computer system's main memory. Disk adapter 318 may be a small computer system interface ("SCSI") adapter that communicates with disk units 320, e.g., disk drive. It is noted that the program of the present invention that may block an excessive number of packets as well as propagate the block request to its neighboring routers 102, as described in steps 504–511 in FIG. 5, may reside in disk unit 320 or in application 350. It is further noted that disk units 320, e.g., disk drive, may store a routing table used for routing packets of data from a source to a destination. It is further noted that disk units 320, e.g., disk drive, may comprise a configuration file as illustrated in FIG. 7 as will be discussed in greater detail in the discussion of FIG. 5. It is further noted that the configuration file may be stored in any non-volatile memory. Communications adapter 334 interconnects bus 312 with server 101 and client 103 enabling router 102 to communicate with server 101 and client 103.

Implementations of the invention include implementations as a computer system programmed to execute the method or methods described herein, and as a computer program product. According to the computer system implementations, sets of instructions for executing the method or methods are resident in the random access memory 314 of one or more computer systems configured generally as described above. Until required by router 102, the set of instructions may be stored as a computer program product in another computer memory, for example, in disk drive 320 (which may include a removable memory such as an optical disk or floppy disk for eventual use in disk drive 320). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
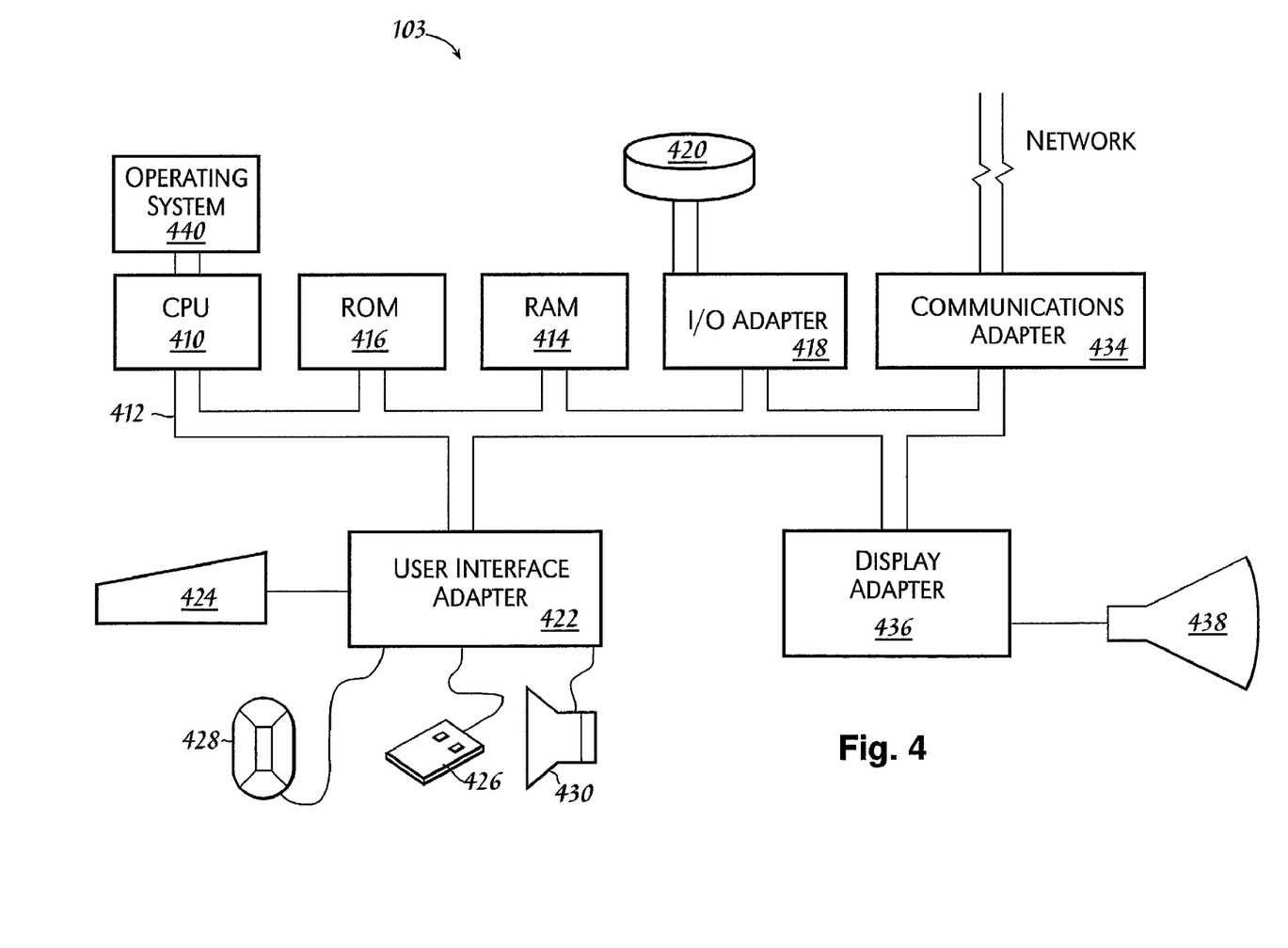
FIG. 4 illustrates an embodiment of a client configured in accordance with the present invention.

FIG. 4—Hardware Configuration of Client

FIG. 4 illustrates a typical hardware configuration of client 103 which is representative of a hardware environment for practicing the present invention. Client 103 has a central processing unit (CPU) 410 coupled to various other components by system bus 412. An operating system 440 runs on CPU 410 and provides control and coordinates the function of the various components of FIG. 4. Read only memory (ROM) 416 is coupled to system bus 412 and includes a basic input/output system ("BIOS") that controls certain basic functions of client 103. Random access memory (RAM) 414, I/O adapter 418, and communications adapter 434 are also coupled to system bus 412. It should be noted that software components including operating system 440 are loaded into RAM 414 which is the computer system's main memory. I/O adapter 418 may be a small computer system interface ("SCSI") adapter that communicates with disk units 420, e.g., disk drive. Communications adapter 434 interconnects bus 412 with router 102 enabling client 103 to communicate with web server 101. Input/Output devices are also connected to system bus 412 via a user interface adapter 422 and a display adapter 436. Keyboard 424, trackball 428, mouse 426 and speaker 430 are all interconnected to bus 412 through user interface adapter 422. Event data may be input to client 103 through any of these devices. A display monitor 438 is connected to system bus 412 by display adapter 436. In this manner, a user is capable of inputting to client 103 through keyboard 424, trackball 428 or mouse 426 and receiving output from client 103 via display 438 or speaker 430.

Implementations of the invention include implementations as a computer system programmed to execute the method or methods described herein, and as a computer program product. According to the computer system implementation, sets of instructions for executing the method or methods are resident in the random access memory 414 of one or more computer systems configured generally as described above. Until required by the computer system, the set of instructions may be stored as a computer program product in another computer memory, for example, in disk drive 420 (which may include a removable memory such as an optical disk or floppy disk for eventual use in the disk drive 420). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Figure 5:
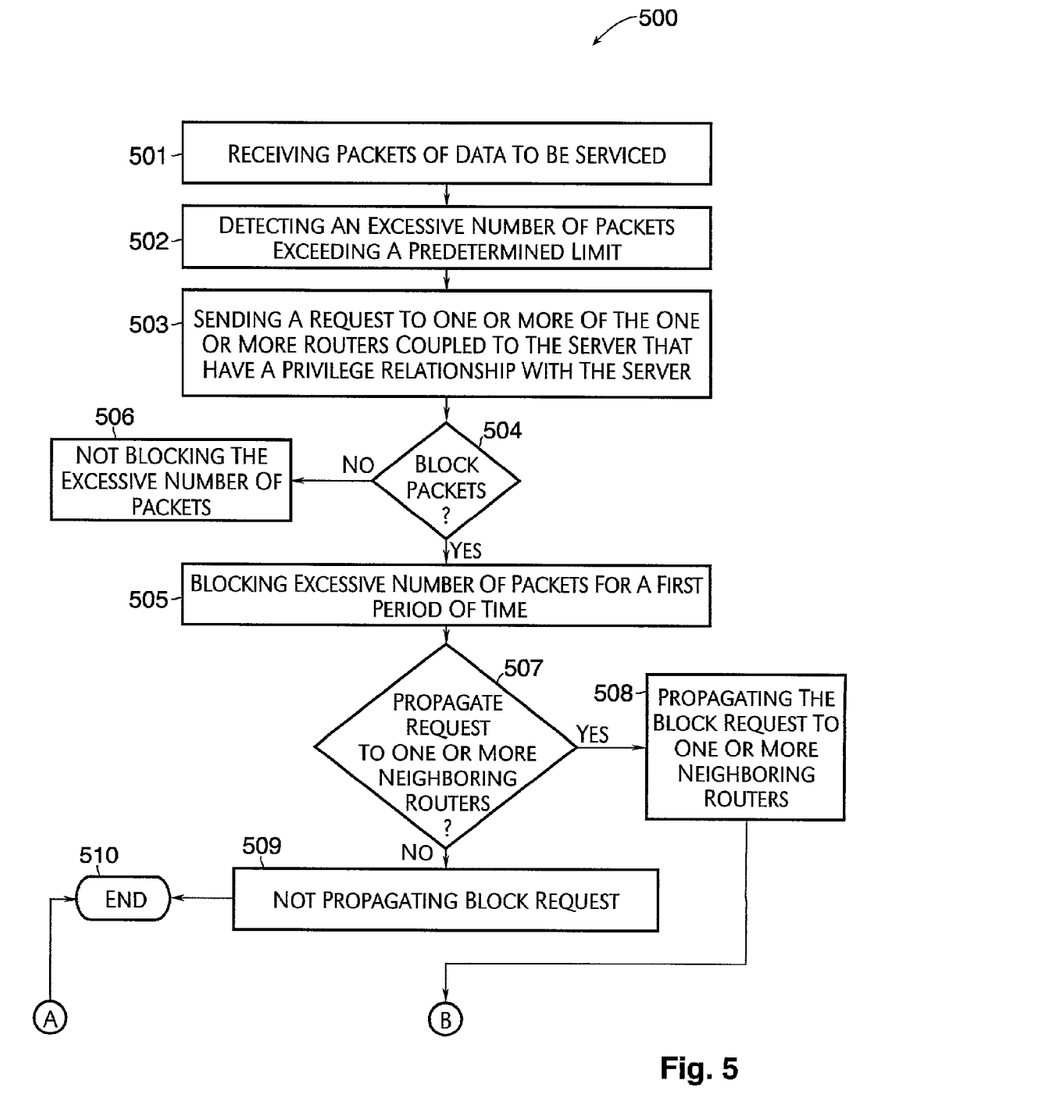
FIG. 5 is a flowchart of a method for preventing at least in part a server overload.

FIG. 5—Method for Preventing at Least in Part a Server Overload

FIG. 5 is a flowchart of one embodiment of the present invention of a method 500 for preventing at least in part an overload of server 101. As stated in the Background Information section, clients may communicate with the web server by sending a number of packets in a given time interval through one or more routers for the server to process. If the number of packets that need to be serviced in a given time exceeds the capability of the web server, the server may crash due to an excessive load. A server crash is at the very least annoying, and may result in serious or irreparable damage. While the server is inoperative, clients coupled to the server may no longer have the ability to communicate with the server. It would therefore be desirable to at least in part prevent server overloads by blocking an excessive number of packets to be processed by the server that would ordinarily overload the server. It would further be desirable to block, i.e., filter, the excessive number of packets of data at the routers located on the server and client side of the network system thereby preventing at least in part an overload of server 101. Method 500 is a method for blocking, i.e., filtering, the excessive number of packets of data by routers located on the server side as well as on the client side.

Figure 6:
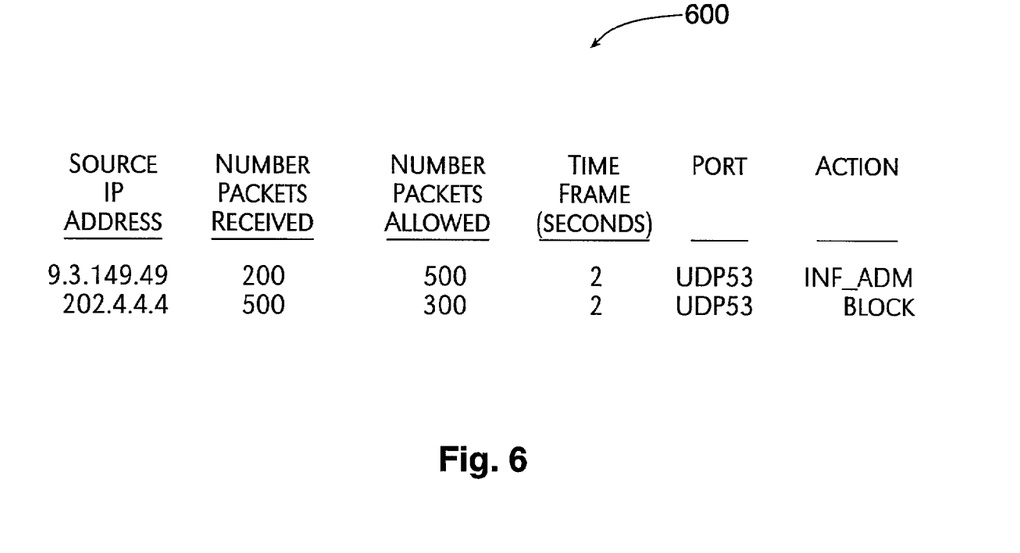
FIG. 6 is an embodiment of the present invention of a configuration file in a server.

In step 501, server 101 may receive packets of data to be serviced from clients 103. In one embodiment, server 101 may be configured to continuously count the number of packets sent from each client 103 during a particular time frame, e.g., two seconds. In one embodiment, a counter implemented in software in server 101 may be configured to continuously count the number of packets sent from each client 103 during a particular time frame, e.g., two seconds. In one embodiment, the number of packets counted during a particular time frame may be continuously tracked in a configuration file as illustrated in FIG. 6. FIG. 6 illustrates an embodiment of the present invention of a configuration file 600. Referring to FIG. 6, configuration file 600 may comprise the number of packets received by a particular client 103 as identified by the source Internet Protocol (IP) address of the particular client 103 during a particular period of time, e.g., two seconds, that may be continuously updated as more packets are received from that particular client 103.

In step 502, server 101 may detect an excessive number of packets exceeding a predetermined limit that may cause an overload of server 101. As stated above, server 101 may be configured to count the number of packets sent from a particular client 103 during a particular time frame. Server 101 may further be configured to extract particular information, e.g., Internet Protocol (IP) destination address, destination port of server 101, that may reside in the packet header field of the packets sent from a particular client 103. Server 101 may further be configured to determine if the number of packets received during a particular time frame exceeds a predetermined limit. In one embodiment, the number of packets allowed to be received from a particular client in a particular time frame may be established by a system administrator in configuration file 600 as illustrated in FIG. 6. Referring to FIG. 6, configuration file 600 may further comprise information such as the source Internet Protocol (IP) address of particular clients 103, the number of packets received from those particular clients 103 during a particular time frame, the port in server 101 to receive packets sent from those particular clients 103, as well as actions server 101 may perform if the number of packets received from those clients 103 during a particular time frame exceeds the predetermined limit as established by a system administrator. As illustrated in FIG. 6, server 101 may block, i.e., filter, (as indicated by "BLOCK" in configuration file 600) packets received during a particular time frame that exceed the predetermined limit. Furthermore, server 101 may inform the system administrator (as indicated by "INF_ADM") when server 101 receives a number of packets during a particular time frame that exceed the predetermined limit. It is noted that configuration file 600 may reside in disk unit 220. It is further noted that configuration file 600 may reside in any non-volatile memory. It is further noted that configuration file 600 may comprise other information and that FIG. 6 is illustrative. Additional details regarding server 101 detecting an excessive number of packets exceeding a predetermined limit are disclosed in U.S. patent application Ser. No. 09/870,610 filed on May 31, 2001, entitled "System and Method for Extending Server Security Through Monitored Load Management," which is hereby incorporated herein by reference in its entirety.

In step 503, server 101 may send a request to one or more of the one or more routers 102 coupled to server 101 that have a privilege relationship with server 101. A privilege relationship may refer to a logical secured connection between router 102 and server 101. In one embodiment, server 101 may store a list of routers 102 that have a privilege relationship with server 101 in a file that may reside in disk unit 220. In one embodiment, the request may be a request to block, i.e., filter, an excessive number of packets of data sent by a particular client 103 to server 101. The request may be sent to one or more of the one or more routers 102 coupled to server 101 in order to block the excessive number of packets closer to the client 103 requesting an excessive number of packets to be serviced by server 101.

In step 504, each of the one or more routers 102, e.g., routers 102A, that receives the request from server 101 may determine whether or not to block, i.e., filter, particular packets as identified in the request for a first period of time, e.g., 100 milliseconds. In one embodiment, each of the one or more routers 102, e.g., routers 102A, that receives the request in step 503 may determine whether or not to block particular packets as identified in the request based on their configuration file as illustrated in FIG. 7. FIG. 7 illustrates an embodiment of the present invention of a configuration file 700. Referring to FIG. 7, configuration file 700 may comprise information as to whether or not to honor the request, i.e., block request, if sent from a particular server 101. Configuration file 700 may comprise row entries of different servers 101 and a column entry as to whether or not to honor a block request sent from those particular servers 101. For example, if "server 1" in configuration file 700 corresponded to server 101, then the router 102 coupled to server 101, e.g., router 102A, with configuration file 700 may honor the block request sent from server 101. That is, the router 102 coupled to server 101, e.g., router 102A, would block the packets identified in the request. The particular packets to block may be identified by one or more of the following information included in the request: Internet Protocol address of client 103, Internet Protocol address of server 101, and port of server 101 to receive packets. It is noted that the request sent by server 101 to one or more of the one or more routers 102 coupled to server 101 that have a privilege relationship with server 101 may comprise the first period of time, e.g., 100 milliseconds. As stated above, the first period of time, e.g., 100 milliseconds, may be the time that particular packets as identified in the request sent by server 101 are blocked. In another embodiment, the first period of time may be determined by routers 102 with a privilege relationship with server 101 deducting the time accrued in the transfer of the request identified in step 503 from server 101 to router 102 as well as the time accrued in processing that request from the period of time identified in the request.

If configuration file 700 indicates to honor the block request, then the particular router 102 coupled to server 101, e.g., router 102A, blocks the excessive number of packets sent by a particular client 103 to server 101 in step 505 for a first period of time. As stated above, the excessive number of packets may be identified by one or more of the following information included in the request: Internet Protocol address of client 103, Internet Protocol address of server 101, and port of server 101 to receive packets.

If configuration file 700 indicates not to honor the block request, then the particular router 102 coupled to server 101, e.g., router 102A, does not block the excessive number of packets sent by a particular client 103 to server 101 in step 506.

In step 507, each of the one or more routers 102, e.g., router 102A, coupled to server 101 that have a privilege relationship with server 101 that receives the request in step 503 may determine whether or not to propagate the request to its one or more neighboring routers 102, e.g., routers 102B–D, which may be located on the client side of network system. Referring to FIG. 7, configuration file 700 may further comprise information as to whether or not to propagate the request, i.e., block request, to its neighboring one or more routers 102 if sent from particular servers 101. Configuration file 700 may comprise row entries of different servers 101 and a column entry as to whether or not to propagate the block request received particular servers 101 to its neighboring one or more routers 102. For example, if "server 1" in configuration file 700 corresponded to server 101, then the router 102 coupled to server 101, e.g., router 102A, with configuration file 700 may propagate the request to its neighboring one or more routers 102, e.g., routers 102B–D. It is noted that configuration file 700 may comprise other information and that FIG. 7 is illustrative. For example, configuration file 700 may comprise information as to whether or not to propagate the request to a particular neighboring router 102 if the request is received from a particular server 101.

If configuration file 700 indicates to propagate the block request, then the particular router 102 coupled to server 101, e.g., router 102A, propagates the blocks request to its one or more neighboring routers 102, e.g., routers 102B–D, in step 508.

If configuration file 700 indicates not to propagate the block request, then the particular router 102 coupled to server 101, e.g., router, does not propagate the request in step 509. Upon not propagating the request, method 500 terminates for that particular router 102 coupled to server 101 in step 510.

Figure 8:
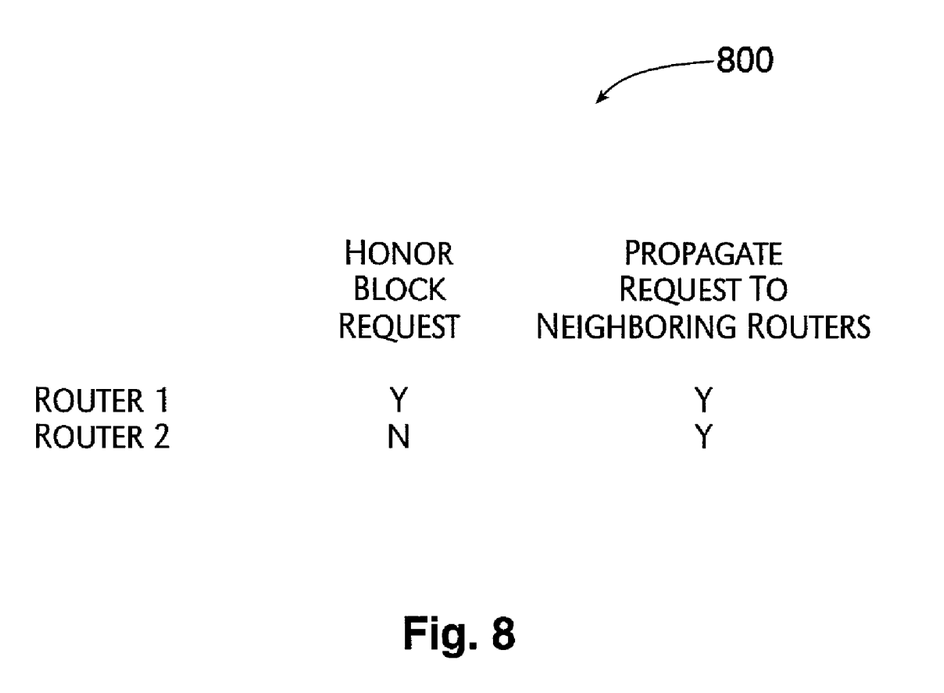
FIG. 8 is an embodiment of the present invention of a configuration file in a router not connected to a server

In step 511, each of the one or more neighboring routers 102, e.g., routers 102B–D, that receives the request in step 508 may determine whether or not to block, i.e., filter, particular packets as identified in the request. In one embodiment, each of the one or more neighboring routers 102 that receives the request in step 508 may determine whether or not to block particular packets as identified in the request based on their configuration file as illustrated in FIG. 8. FIG. 8 illustrates an embodiment of the present invention of a configuration file 800. Referring to FIG. 8, configuration file 800 may comprise information as to whether or not to honor the request, i.e., block request, if sent from particular routers 102. Configuration file 800 may comprise row entries of different routers 102 and a column entry as to whether or not to honor a block request sent from those particular routers 102. For example, if "router 1" in configuration file 800 corresponded to router 102A, then the neighboring router 102, e.g., router 102C, with configuration file 800 may honor the block request sent from router 102A. That is, the neighboring router 102, e.g., router 102C, would block the packets identified in the request. As stated above, the packets may be identified in the request by one or more of the following information included in the request: Internet Protocol address of client 103, Internet Protocol address of server 101, and port of server 101 to receive packets.

If configuration file 800 indicates to honor the block request, then the particular neighboring router 102, e.g., router 102C, blocks the excessive number of packets sent by a particular client 103 to server 101 for a second period of time in step 512. As stated above, the excessive number of packets may be identified by one or more of the following information included in the request: Internet Protocol address of client 103, Internet Protocol address of server 101, and port of server 101 to receive packets. In one embodiment, the second period of time may be determined by the particular neighboring router 102, e.g., router 102C, deducting the time accrued in the transfer of the request identified in step 503 from server 101 to the particular neighboring router 102, e.g., router 102C, as well as the time accrued in processing that request from the time period identified in the request. In one embodiment, the second period of time may be less than the first period of time since the time accrued in the transfer of the request identified in step 503 from server 101 to the particular neighboring router 102, e.g., router 102C, is greater than the time accrued in the transfer of the request identified in step 503 from server 101 to the router 102, e.g., router 102A, coupled to server 101.

If configuration file 800 indicates not to honor the block request, then the particular neighboring router 102, e.g., router 102B, does not block the excessive number of packets sent by a particular client 103 to server 101 in step 513.

In step 514, each of the one or more neighboring routers 102, e.g., routers 102B–D, that receives the request in step 508 may determine whether or not to propagate the request to its one or more neighboring routers 102. Referring to FIG. 8, configuration file 800 may further comprise information as to whether or not to propagate the request, i.e., block request, to its neighboring one or more routers 102 if sent from particular routers 102. Configuration file 800 may comprise row entries of different routers 102 and a column entry as to whether or not to propagate the block request received particular routers 102 to its neighboring one or more routers 102. For example, if "router 1" in configuration file 800 corresponded to router 102A, then the neighboring router 102, e.g., router 102C, with configuration file 800 may propagate the request to its neighboring one or more routers 102. It is noted that configuration file 800 may comprise other information and that FIG. 8 is illustrative. For example, configuration file 800 may comprise information as to whether or not to propagate the request to a particular neighboring router 102 if the request is received from a different router 102.

If configuration file 800 indicates to propagate the block request, then the particular neighboring router 102, e.g., router 102C, propagates the blocks request to its one or more neighboring routers 102 in step 515. The one or more neighboring routers 102 that received the block request may then determine whether or not to block, i.e., filter, particular packets as identified in the request, i.e., block request, in step 511.

If configuration file 800 indicates not to propagate the block request, then the particular neighboring router 102, e.g., router 102B, does not propagate the request in step 516. Upon not propagating the request, method 500 terminates for that particular neighboring router 102 in step 510.

It is noted that method 500 may be executed in a different order presented and that the order presented in the discussion of FIG. 5 is illustrative. It is further noted that certain steps, e.g., steps 504–509, may be executed almost concurrently.

Although the system and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for preventing at least in part a server overload comprising the steps of:
    detecting an excessive number of packets exceeding a predetermined limit;

sending a request to one or more of one or more routers connected to said server having a privilege relationship with said server, wherein said request is a request to block said excessive number of packets, and blocking said excessive number of packets by one or more of said one or more routers having said privilege relationship with said server for a first period of time;

wherein each of said one or more routers having said privilege relationship with said server includes a configuration file, wherein said configuration file comprises information indicating whether to propagate said request to one or more neighboring routers.

2. The method as recited in claim 1 further comprising the step of:

propagating said request to block said excessive number of packets to one or more neighboring routers by one or more of said one or more routers having said privilege relationship with said server.

3. The method as recited in claim 2 further comprising the step of:

determining whether to block said excessive number of packets by said one or more neighboring routers.

4. The method as recited in claim 3, wherein each of said one or more neighboring routers includes a second configuration file, wherein said second configuration file comprises information indicating whether to honor said request to block said excessive number of packets.

5. The method as recited in claim 4, wherein if said second configuration file indicates to honor said request to block said excessive number of packets then the method further comprises the step of:

blocking said excessive number of packets for a second period of time by one or more of said one or more neighboring routers if said second configuration file in said one or more of said one or more neighboring routers indicates to honor said request to block said excessive number of packets.

6. The method as recited in claim 5, wherein said second period of time is less than said first period of time.

7. The method as recited in claim 3 further comprising the step of:

determining whether to propagate said request by said one or more neighboring routers.

8. The method as recited in claim 7, wherein each of said one or more neighboring routers includes a second configuration file, wherein said second configuration file comprises information indicating whether to propagate said request to one or more additional neighboring routers.

9. The method as recited in claim 8, wherein if said second configuration file indicates to propagate said request to said one or more additional neighboring routers then the method further comprises the step of:

propagating said request to one or more additional neighboring routers of one or more neighboring routers of said one or more neighboring routers if said second configuration file in said one or more neighboring routers of said one or more neighboring routers indicates to propagate said request to said one or more additional neighboring routers.

10. The method as recited in claim 1, wherein said request comprises one or more of an Internet Protocol address of said server, an Internet Protocol address of a client, and a port of said server.

11. The method as recited in claim 1, wherein each of said one or more routers connected to said server includes a second configuration file, wherein said second configuration file comprises information indicating whether a particular router has said privilege relationship with said server.

12. The method as recited in claim 1, wherein each of said one or more routers that have said privilege relationship with said server includes said configuration file, wherein said configuration file comprises information indicating whether to honor said request to block said excessive number of packets.

13. The method as recited in claim 12, wherein said one or more of said one or more routers having said privilege relationship with said server block said excessive number of packets for said first period of time if said configuration file in said one or more of said one or more routers with said privilege relationship with said server indicates to honor said request to block said excessive number of packets.

14. The method as recited in claim 1, wherein if said configuration file indicates to propagate said request to said one or more neighboring routers then the method further comprises the step of:

propagating said request to one or more neighboring routers of one or more routers of said one or more routers with said privilege relationship with said server if said configuration file in said one or more routers of said one or more routers with said privilege relationship with said server indicates to propagate said request to said one or more neighboring routers.

15. A system, comprising:

a server;

one or more routers coupled to said server, wherein one or more of said one or more routers with a privilege relationship with said server comprise circuitry for blocking an excessive number of packets for a first period of time;

wherein said server comprises:

a processor;

a memory unit storing a computer program operable for preventing at least in part an overload of said server;

a bus system coupling the processor to the memory unit, wherein the computer program comprises the programming steps of:

detecting an excessive number of packets exceeding a predetermined limit; and sending a request to one or more of said one or more routers connected to said server having said privilege relationship with said server, wherein said request is a request to block said excessive number of packets;

wherein each of said one or more routers having said privilege relationship with said server includes a configuration file, wherein said configuration file comprises information indicating whether to propagate said request to one or more neighboring routers.

16. The system as recited in claim 15, wherein one or more of said one or more routers having said privilege relationship with said server comprise circuitry for:

propagating said request to block said excessive number of packets to one or more neighboring routers.

17. The system as recited in claim 16 further comprises:

one or more neighboring routers coupled to one or more clients configured to forward packets of data from said one or more clients to said server, wherein said one or more neighboring routers comprise circuitry for:

determining whether to block said excessive number of packets.

18. The system as recited in claim 17, wherein each of said one or more neighboring routers includes a second configuration file, wherein said second configuration file comprises information indicating whether to honor said request to block said excessive number of packets.

19. The system as recited in claim 18, wherein if said second configuration indicates to honor said request to block said excessive number of packets then one or more of said one or more neighboring routers comprise circuitry for:
   blocking said excessive number of packets for a second period of time if said second configuration file in said one or more of said one or more neighboring routers indicates to honor said request to block said excessive number of packets.

20. The system as recited in claim 19, wherein said second period of time is less than said first period of time.

21. The system as recited in claim 17, wherein said one or more neighboring routers further comprise circuitry for:
   determining whether to propagate said request.

22. The system as recited in claim 21, wherein each of said one or more neighboring routers includes a second configuration file, wherein said second configuration file comprises information indicating whether to propagate said request to one or more additional neighboring routers.

23. The system as recited in claim 22, wherein if said second configuration indicates to propagate said request to said one or more additional neighboring routers then one or more neighboring routers of said one or more neighboring routers comprise circuitry for:
   propagating said request to one or more additional neighboring routers of said one or more neighboring routers of said one or more neighboring routers if said second configuration file in said one or more neighboring routers of said one or more neighboring routers indicates to propagate said request to said one or more additional neighboring routers.

24. The system as recited in claim 15, wherein said request comprises an Internet Protocol address of said server, an Internet Protocol address of a particular client, and a port of said server.

25. The system as recited in claim 15, wherein each of said one or more routers connected to said server includes a second configuration file, wherein said second configuration file comprises information indicating whether a particular router has said privilege relationship with said server.

26. The system as recited in claim 15, wherein each of said one or more routers having said privilege relationship with said server includes said configuration file, wherein said configuration file comprises information indicating whether to honor said request to block said excessive number of packets.

27. The system as recited in claim 26, wherein said one or more of said one or more routers having said privilege relationship with said server block said excessive number of packets for said first period of time if said configuration file in said one or more of said one or more routers with said privilege relationship with said server indicates to honor said request to block said excessive number of packets.

28. The system as recited in claim 15, wherein if said configuration file indicates to propagate said request to said one or more neighboring routers then one or more routers of said one or more routers with said privilege relationship with said server comprise circuitry for:
   propagating said request to one or more neighboring routers of said one or more routers of said one or more routers with said privilege relationship with said server if said configuration file in said one or more of said one or more routers with said privilege relationship with said server indicates to propagate said request to said one or more neighboring routers.

29. A system, comprising:
   a server; and
   one or more routers coupled to said server;
   wherein one or more of said one or more routers coupled to said server having a privilege relationship with said server comprise circuitry for receiving a request, wherein said request is a request to block an excessive number of packets detected by said server, wherein one or more of said one or more routers having said privilege relationship with said server comprise circuitry for blocking said excessive number of packets for a first period of time;
   wherein each of said one or more routers having said privilege relationship with said server includes a configuration file, wherein said configuration file comprises information indicating whether to propagate said request to one or more neighboring routers.

30. The system as recited in claim 29, wherein one or more of said one or more routers connected to said server having said privilege relationship comprise circuitry for:
   propagating said request to block said excessive number of packets to one or more neighboring routers.

31. The system as recited in claim 30, wherein said one or more neighboring routers comprise circuitry for:
   determining whether to block said excessive number of packets.

32. The system as recited in claim 31, wherein each of said one or more neighboring routers includes a second configuration file, wherein said second configuration file comprises information indicating whether to honor said request to block said excessive number of packets.

33. The system as recited in claim 32, wherein if said second configuration indicates to honor said request to block said excessive number of packets then one or more of said one or more neighboring routers comprise circuitry for:
   blocking said excessive number of packets for a second period of time if said second configuration file in said one or more of said one or more neighboring routers indicates to honor said request to block said excessive number of packets.

34. The system as recited in claim 33, wherein said second period of time is less than said first period of time.

35. The system as recited in claim 31, wherein said one or more neighboring routers further comprise circuitry for:
   determining whether to propagate said request.

36. The system as recited in claim 35, wherein each of said one or more neighboring routers includes a second configuration file, wherein said second configuration file comprises information indicating whether to propagate said request to one or more additional neighboring routers.

37. The system as recited in claim 36, wherein if said second configuration indicates to propagate said request to said one or more additional neighboring routers then one or more neighboring routers of said one or more neighboring routers comprise circuitry for:
   propagating said request to one or more additional neighboring routers of said one or more neighboring routers of said one or more neighboring routers if said second configuration file in said one or more neighboring routers of said one or more neighboring routers indicates to propagate said request to said one or more additional neighboring routers.

38. The system as recited in claim 29, wherein each of said one or more routers connected to said server includes a second configuration file, wherein said second configuration file comprises information indicating whether a particular router has said privilege relationship with said server.

39. The system as recited in claim 29, wherein each of said one or more routers having said privilege relationship with said server includes said configuration file, wherein said configuration file comprises information indicating whether to honor said request to block said excessive number of packets.

40. The system as recited in claim 39, wherein said one or more of said one or more routers having said privilege relationship with said server block said excessive number of packets for said first period of time if said configuration file in said one or more of said one or more routers with said privilege relationship with said server indicates to honor said request to block said excessive number of packets.

41. The system as recited in claim 29, wherein if said configuration file indicates to propagate said request to said one or more neighboring routers then one or more routers of said one or more routers with said privilege relationship with said server comprise circuitry for:

propagating said request to one or more neighboring routers of said one or more routers of said one or more routers with said privilege relationship with said server if said configuration file in said one or more routers of said one or more routers with said privilege relationship with said server indicates to propagate said request to said one or more neighboring routers.

* * * * *